United States Patent
Rath et al.

(10) Patent No.: US 12,547,588 B1
(45) Date of Patent: Feb. 10, 2026

(54) SELECTIVE AUTO RETENTION LOCKING THROUGH SUB-DIRECTORY LEVEL EXCLUSION POLICY

(71) Applicant: Dell Products L.P., Round Rock, TX (US)

(72) Inventors: Jagannathdas Rath, Bengaluru (IN); Srisailendra Yallapragada, Cupertino, CA (US); Nitin Madan, San Jose, CA (US); Salil Dangi, Mission Viejo, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/791,011

(22) Filed: Jul. 31, 2024

(51) Int. Cl.
*G06F 7/00* (2006.01)
*G06F 16/11* (2019.01)
*G06F 16/176* (2019.01)
*G06F 16/185* (2019.01)
*G06F 17/00* (2019.01)

(52) U.S. Cl.
CPC ........ *G06F 16/125* (2019.01); *G06F 16/1774* (2019.01); *G06F 16/185* (2019.01)

(58) Field of Classification Search
CPC ... G06F 16/125; G06F 16/1774; G06F 16/185
USPC ........................................................ 707/704
See application file for complete search history.

(56) References Cited

U.S. PATENT DOCUMENTS

| | | | | |
|---|---|---|---|---|
| 7,155,460 B2* | 12/2006 | McGovern | ............ | G06F 16/181 |
| 2004/0186858 A1* | 9/2004 | McGovern | ............ | G06F 16/181 |
| 2005/0097260 A1* | 5/2005 | McGovern | .............. | G06F 21/78 711/100 |
| 2007/0118687 A1* | 5/2007 | McGovern | .............. | G06F 21/78 711/112 |
| 2008/0034003 A1* | 2/2008 | Stakutis | ................ | G06F 16/125 |
| 2013/0110787 A1* | 5/2013 | Garimella | ............. | G06F 16/113 707/E17.007 |
| 2017/0060885 A1* | 3/2017 | Gangadharaiah | ..... | G06F 16/182 |
| 2017/0060897 A1* | 3/2017 | Madaan | ................ | G06F 16/125 |
| 2022/0382639 A1* | 12/2022 | Yadav | ...................... | G06F 16/23 |
| 2025/0245379 A1* | 7/2025 | Rath | .................... | G06F 21/6245 |

* cited by examiner

*Primary Examiner* — Pavan Mamillapalli
(74) *Attorney, Agent, or Firm* — Staniford Tomita LLP

(57) ABSTRACT

A selective automatic retention lock system defines, as attributes, an automatic retention lock (ARL) period specifying an amount of time to lock the file, and a cooling (COP) period specifying an amount of time within the first ARL after which the file will be locked if no modifications are made to the file during the first COP. An entire directory tree can be designated as ARL enabled, and certain sub-level directories within the namespace can be excluded from ARL by appropriate labeling so that files in the directory cannot be auto retention locked under the ARL policy of the entire directory tree.

14 Claims, 10 Drawing Sheets

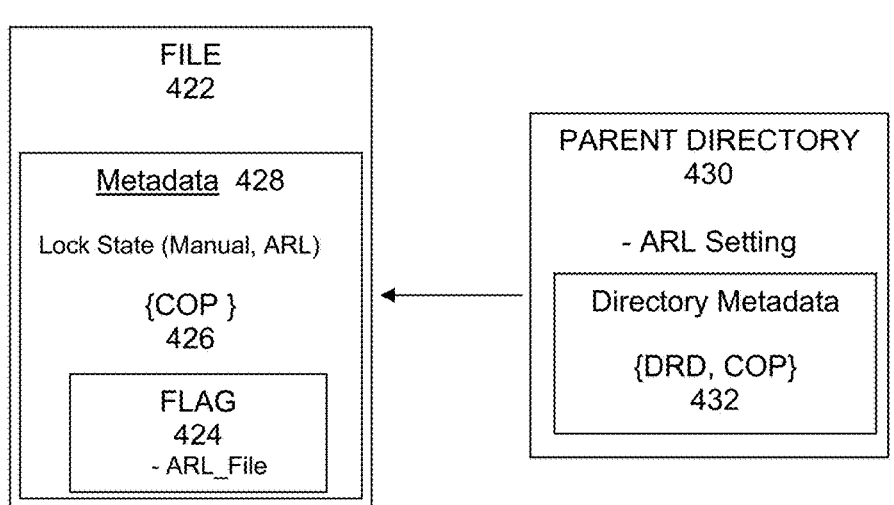
FIG. 4
| | | |
|---|---|---|
| File Not Locked via ARL | Not Marked as 'ARL_FILE' | No restrictions |
| ARL File is in COP | current time <= file last_mod_time + COP | No restrictions |
| ARL File is Locked | current time > last_mod_time + COP | Modifications blocked |
| ARL Lock Expired | current time > file create time + 'default-retention-duration' | Only deletes and renames allowed |
FIG. 5
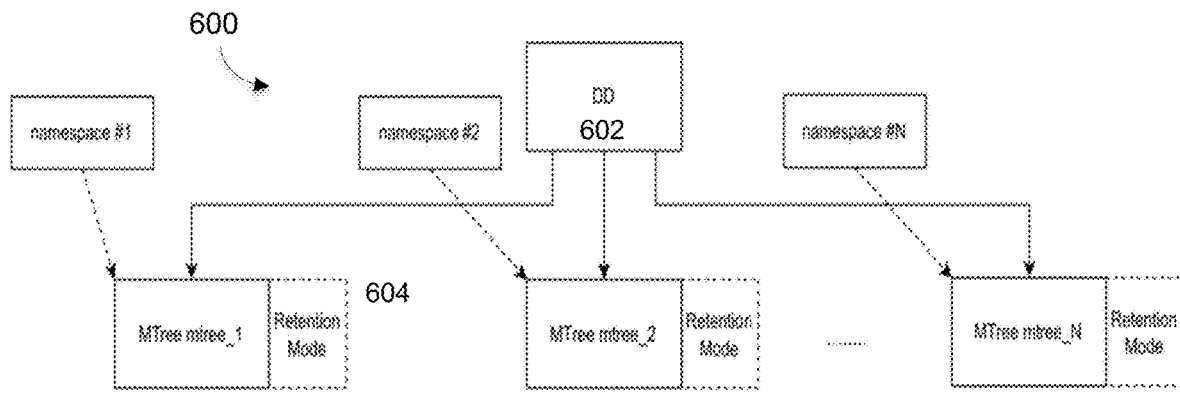
FIG. 6

SELECTIVE AUTO RETENTION LOCKING THROUGH SUB-DIRECTORY LEVEL EXCLUSION POLICY

TECHNICAL FIELD

This invention relates generally to data protection systems, and more particularly to an efficient method for selective namespace automatic retention locking in backup systems.

BACKGROUND OF THE INVENTION

Long term retention of data for regulatory compliance, organizational governance needs, or any similar reason requires data to be locked for a certain duration after it is ingested/written. Retention locking is often used to store this data in an immutable form for the prescribed duration, which can be anywhere from a few days or few weeks to several years or decades. After the retention duration (lock period) expires, the backup applications cleanup the backups and delete the expired files on the backup server.

Two common ways to lock files are manual locking or automatic locking. Manual locking is performed explicitly by a user calling a retention lock API (e.g., server or storage REST API) or by a backup application after the data is ingested. For example, updating the "last access time" of a file can trigger a lock operation in some backup servers (e.g., PowerProtect Data Domain). Alternatively, certain client software (e.g., PowerProtect DDBoost) provide explicit retention lock APIs that can be triggered by an application to lock individual files.

Automatic retention locking (ARL) involves no explicit or manual lock operation, but is performed by the system automatically upon completion of data ingestion. The files are locked automatically for a pre-defined duration once they are ingested, and this duration is generally known as Auto Lock Period or default retention duration. With ARL, the backup server or cloud storage software is responsible to ensure that files are locked automatically after they are ingested into the backup system. For this method, most backup servers provide a cooling period before the file gets locked automatically. The cooling period (COP) is the amount of time after which a file gets auto locked if not modified within that time. For example, a COP of two hours would mean that file would get auto locked if it is not modified within two hours. With manual locking, no cooling period is provided, and a file is locked immediately upon manual locking. Backup servers allow configuring ARL at the Mtree/Storage Unit level and the policy remains in effect for the whole Mtree (or other directory tree structure). Each and every file written to the Mtree remains locked for the configured auto retention duration.

Non-integrated backup applications are applications that are not integrated with the backup server's retention lock capability. This means that such backup applications will not be able to trigger retention lock APIs of the backup server for the backup data after their ingest. Instead, they must rely on some kind of storage controlled locking capability, like ARL, where the backup server auto locks the files once they are ingested. Non-integrated backup applications are thus one of the biggest consumers of the ARL feature.

In addition to writing the client backup data to the Mtrees, some backup applications also write one or more metadata files in the same Mtree/storage space. The metadata may be for the individual backup jobs or all backups as a whole or catalogues or indexes etc., depending on implementation.

In present systems, a problem arises when non-integrated backup applications modify metadata in the future (e.g., when new backup jobs are executed or as needed). With ARL enabled on the Mtree, the metadata will get auto-locked after they are written to the Mtree for the first time. Any subsequent modification will fail, and consequently, all subsequent backup jobs will also start failing from the time the metadata gets auto-locked. Because of this, non-integrated backup applications are not able to utilize the backup server's retention-locking capabilities at all, either manual and ARL.

Backup applications are usually designed to utilize a single Mtree as the storage device for protection policies. Another present way to address the above problem is to use multiple Mtrees, such as one for metadata without ARL and other for backup data with ARL enabled. Utilizing multiple Mtrees for the same policy, however, requires implementing different operational workflows for different backup servers, which impacts overall simplicity and product convenience. This also cuts in half the maximum allowable number of Mtrees from the backup server. Implementing logic in the backup application to integrate with the backup server's retention-locking capabilities also requires tremendous resources to be invested by the backup application vendor, and is thus typically avoided for cost purposes.

What is needed, therefore, is a system and method to provide selective auto retention locking at the directory level to accommodate non-integrated backup applications, and to store non-locked metadata files along with locked backup data in the same ARL enabled Mtree/storage unit.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, Data Domain Boost, and Power Protect are trademarks of Dell Technologies, Inc.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 4 illustrates labelling a file with a flag indicating its lock state, under some embodiments.

FIG. 5 is a table that illustrates certain lock state determination logic rules, under some embodiments.

FIG. 6 illustrates an example directory structure comprising namespaces in a DDFS system, under an some embodiments.

DETAILED DESCRIPTION

Figure 1:
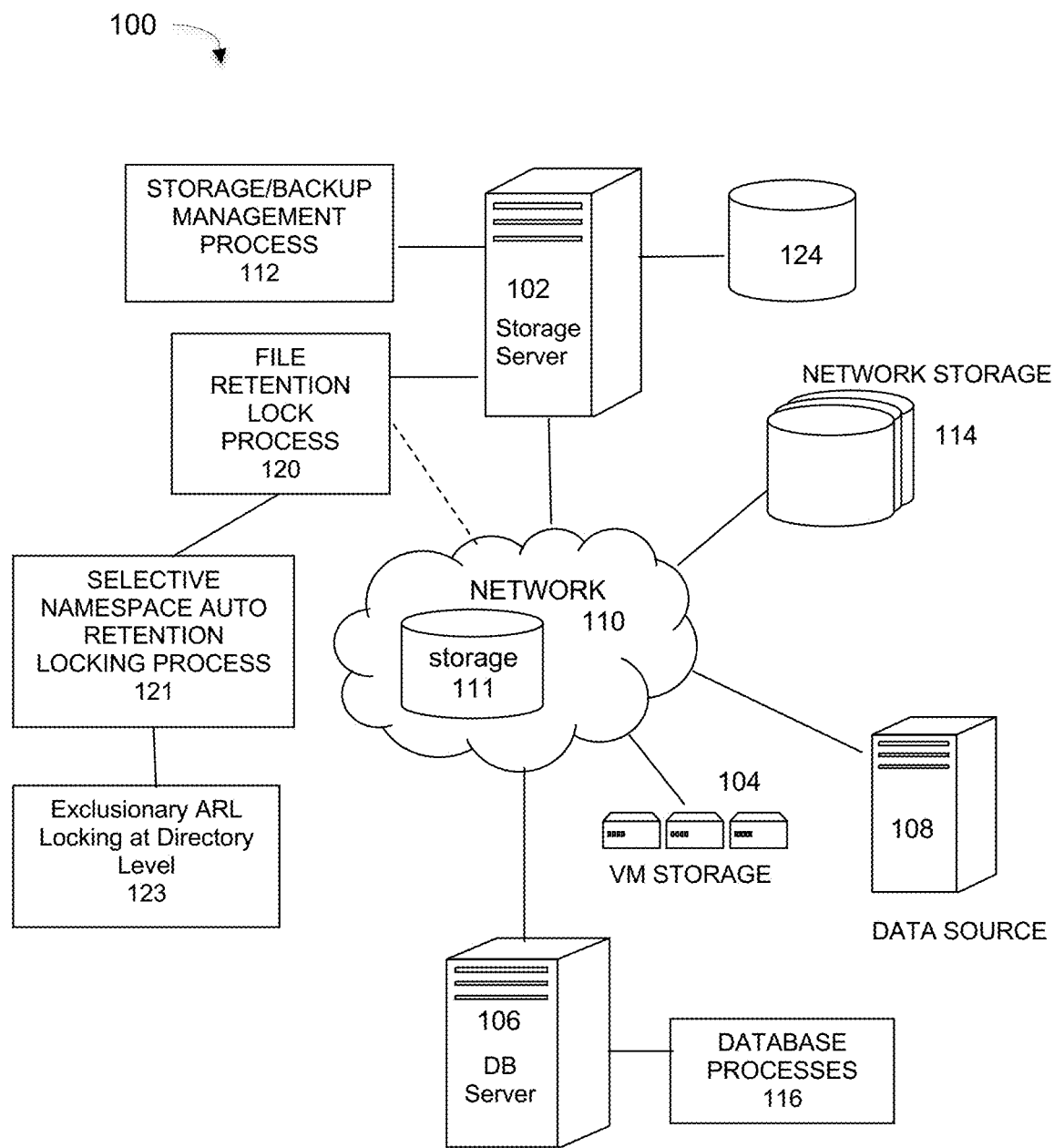
FIG. 1 is a diagram of a data protection network implementing a selective namespace auto retention lock (ARL) process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. The computer-readable storage medium or computer-usable medium may be a random-access memory (RAM), read-only memory (ROM), or a persistent store, such as a mass storage device, hard drives, CD, DVD, tape, erasable programmable read-only memory (EPROM or flash), or any magnetic, electromagnetic, optical, or electrical means or system, apparatus or device for storing information. The computer-readable storage medium or computer-usable medium may be any combination of these devices or even paper or another suitable medium upon which the program code is printed and processed in a suitable manner and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software development and deployment in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a system and method for providing efficient and selective namespace automatic retention locks backup datasets, and FIG. 1 illustrates a computer network system that implements one or more embodiments of such a system. In system 100, a storage server 102 executes a data storage or backup management process 112 that coordinates or manages the backup of data from one or more data sources 104, 106, or 108 to storage devices, such as local storage in 102 itself, network storage 114, or possible cloud storage 111 in network 110. The backup server 102 hosts the backup application to manage and trigger backup jobs. These backup jobs will backup data (VMs, databases, files, etc.) from the data sources (like VMs, Databases, files etc.) to the backup/storage server.

With regard to virtual storage 104, any number of virtual machines (VMs) or groups of VMs (e.g., organized into virtual centers) may be provided to serve as backup sources. The data sourced by the data source may be any appropriate data, such as database data that is part of a database management system, and the data may reside on one or more hard drives for the database(s) in a variety of formats. Thus, a data source may be a database server 106 executing one or more database processes 116, or it may be any other sources of data 108 for use by the resources of system 100.

The network server computers are coupled directly or indirectly to the data storage 114, VMs 104, and the data sources and other resources through network 110, which is typically a LAN, WAN or other appropriate network like a cloud network. Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform. In an embodiment, network 110 may be a private network or it may be a public network provided by a third-party cloud service provider (CSP).

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Power Protect Data Domain Restorer (DDR)-based deduplication storage system, and storage server 102 may be implemented as a DDR Deduplication Storage server provided by Dell. However, other similar backup and storage systems are also possible.

In an embodiment, the storage (or backup) server process 112 applies one or more backup policies (e.g., conforming to application rules or governance/compliance rules) for storing the data. The deduplication backup system 102 deduplicates the data according to its processes and then sends this data to storage media, also referred to as a 'storage target', which may be local storage 124, network storage 114, or any other storage of any appropriate media (e.g., disk, tape, solid state memory, etc.). For full or partial cloud-based networks, the backup data can also, or instead be sent to cloud storage 111 in network 110 after local storage in the backup system.

The backup (or storage) server 102 may comprise a Dell Data Domain File System (DDFS) or other similar deduplication system. In general, a file in DDFS is represented by a Merkle tree, with user data as variable sized segments at the bottom level of the tree, referred to as L0 segments. The hash fingerprints of those segments are grouped together at the next higher level of the tree to form new segments, referred to as L1 segments, and hash fingerprints of L1 segments are grouped together as L2 segments, and so on up to L6 which represents the entire file. The top segment of the tree is always an L6 segment and segments above L0 are referred to as Lp chunks. The L6 segment of every file is stored in a namespace which is represented as a B+ Tree. The L0 and Lp segments are written to separate containers, known as L0 and Lp containers. In DDFS, the files may be stored using an Mtree (Managed Tree) architecture that can be used to store the data file itself and as an index to an existing data file to provide fast searches and relational functionality. An Mtree is a namespace unit of management for DDFS, and is implemented using a Btree. Mtrees are logical partitions of the file system that are identified by unique names and can be used to create deduplication client storage units, virtual data pools, and network file shares.

After the data is received in the backup system and data ingest is complete, the backup application 112 issues lock requests through process 120 to set the lock for the newly written files. Files are thus generally retention locked after they are written to the storage media or cloud storage. The retention lock can be applied to any appropriate data object or element (e.g., directory, file, filesystem, etc.) as it is written and stored in the storage media. For the embodiment of FIG. 1, the lock is applied automatically by process 121 using certain defined automatic retention lock attributes that are associated with or encoded in the file to be retained and locked.

It should be noted that the data backup system of FIG. 1 is provided for purposes of illustration, and retention lock process 120 can be used with any appropriate deduplicated backup system (other than Power Protect Data Domain), and other or alternative retention policies, rules, and standards. Furthermore, although embodiments are described with relation to retention locking for certain reasons, such as regulatory compliance, embodiments are not so limited and files may be retention locked for a variety of other reasons as well.

As shown in FIG. 1, system 100 includes file retention lock process 120 that locks selected files against modification or deletion to protect these files from unintended or unwanted changes, or malicious tampering. In present systems, retention locking is typically enabled by user or administrator command at time of file creation or modification to lock the file for a certain period of time, which may be extended or reverted by the user, as per allowed policies. Retention locking may also be implemented automatically by the storage server 102 as part of backup management process 112, or it may be executed by a cloud or network 110 resource, such as if a set of files is governed by a policy that automatically locks the files.

As mentioned above, retention locks can be applied manually, such as by executing a command or calling a retention lock API provided by the backup server or cloud storage REST API. For example, a PowerProtect Data Domain system, the Power Protect DDBoost client software provides explicit retention lock APIs that can be triggered by any application to lock individual files, or AWS S3 REST APIs can be instructed to lock a file by adding certain HTTP headers. Other manual retention lock mechanisms are also commonly available. For ARL or default locking, the files are locked automatically for a predefined duration once the file or backup data is ingested by the backup server, and a COP time can be defined to the period after which a file gets auto-locked if it is not modified within that time.

To overcome the issues of requiring manual locking or extension locking individual files in present systems, embodiments of system 100 include a selective namespace ARL process that provides an efficient method to selectively lock a subset of the namespace (subdirectories/directories/ etc.) and provide faster lock extensions on large numbers of files virtually instantaneously.

In an embodiment, this directory structure may comprise an Mtree, where system 100 is a Power Protect Data Domain deduplication backup system, and a Power Protect Data Domain Managed Tree (Mtree) is a user-defined logical partition of the Power Protect Data Domain file system that enables granular management of a data in Data Domain system. In an embodiment, retention lock process software 120 can be enabled at an individual Mtree level. In general, once a backup file has been migrated onto a Data Domain system, it is the responsibility of the backup application to set and communicate the retention period attribute to the Data Domain system.

In an embodiment, process 121 provides selective ARL setting in which backup applications or users can define retention lock attributes (RL attributes) or configuration (RL configuration) settings at a directory level in a filesystem, directory tree (Mtree), S3 container, S3 bucket, or any other relevant data organizational hierarchy, and which can generically be referred to as a 'filesystem.'

Figure 2:
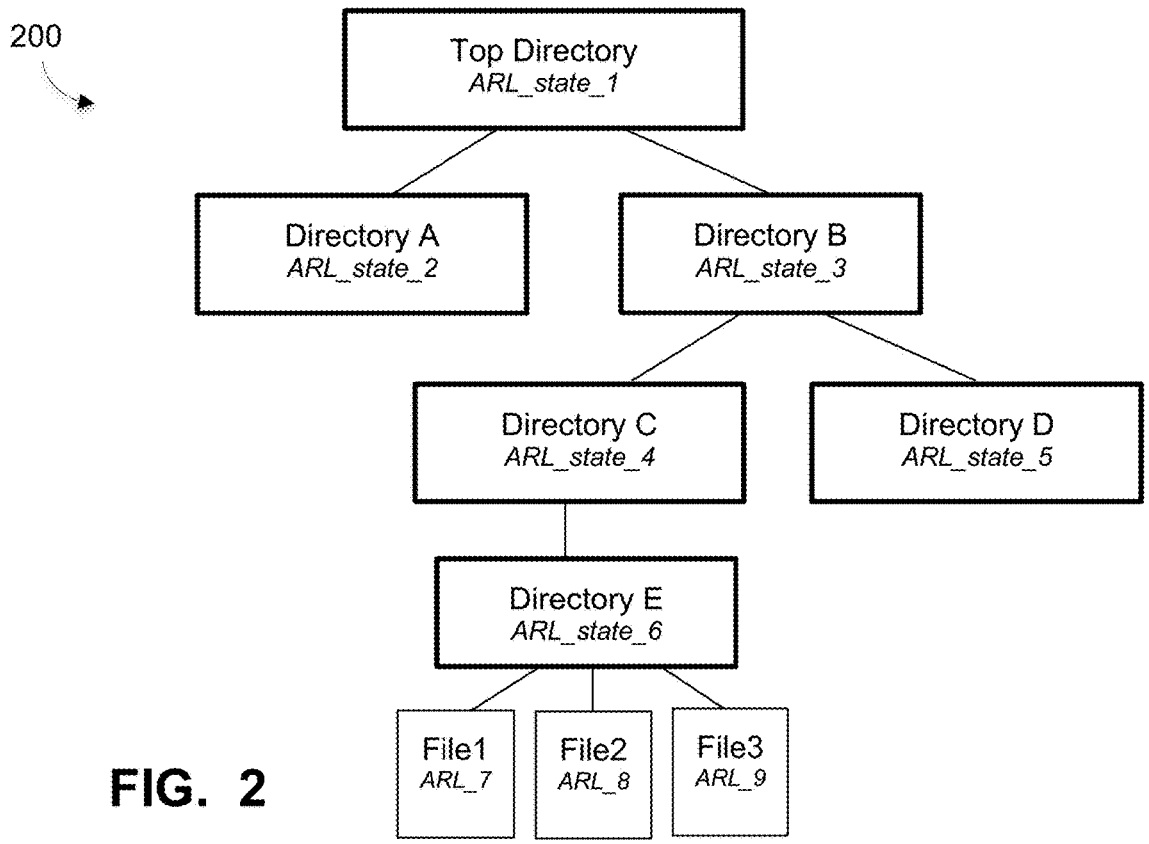
FIG. 2 illustrates an example namespace comprising a hierarchical filesystem with directories and files, under some embodiments.

FIG. 2 illustrates an example namespace comprising a hierarchical filesystem with directories and files, under some embodiments. For the example of FIG. 2, filesystem 200 has a root or top directory, which in turn has two sub-directories (Directory A and Directory B). Each sub-directory may have any number of further sub-directories or directories, such as Directories C and D under Directory B, and so on. In turn, each of these lower level directories can have any number of directories, such as Directory E, for example. Each directory may also store any number of files or other data elements, such as file1, file2, and file3, etc., such as shown for Directory E. The hierarchical organization of the filesystem parent and child elements that can be expressed in text through standard expressions, such as "top_directory/directory_B/directoryC/directoryE/file2."

FIG. 2 is provided for purposes of example only, and a filesystem may comprise any practical number of directories, sub-directories, files, and so on. The filesystem 200 of FIG. 2 may represent an Mtree used in system 100, under some embodiments.

Embodiments of process 121 operate at the file or directory level of the filesystem, and use certain directory entry and inode mechanisms of the file system. For purposes of the present description, it is understood that an inode is a data structure that stores the complete metadata of a particular file (except the name), such as permissions, ownership, flags, type, blocks where data is stored, etc. It may also identify the file operations that need the inode, and also the type (i.e., a file or directory or block device, special device etc.) to which it belongs. Each inode stores the attributes and disk block locations of the object's data. Additionally, each file has a unique inode number, which identifies the file in the file system. When a file is created, an inode is created to hold the file's metadata. inodes are independent of filenames, which means that a single file can be renamed and it will still point to the same inode as the original.

Each file/directory in a filesystem is identified by the file-name/directory-name and that is always mapped to a inode data-structure in the filesystem. A directory entry (dentry or dirent) is a data-structure that maps such filenames to an inode number. Directories as well as files, both are backed up by an inode.

Figure 3:
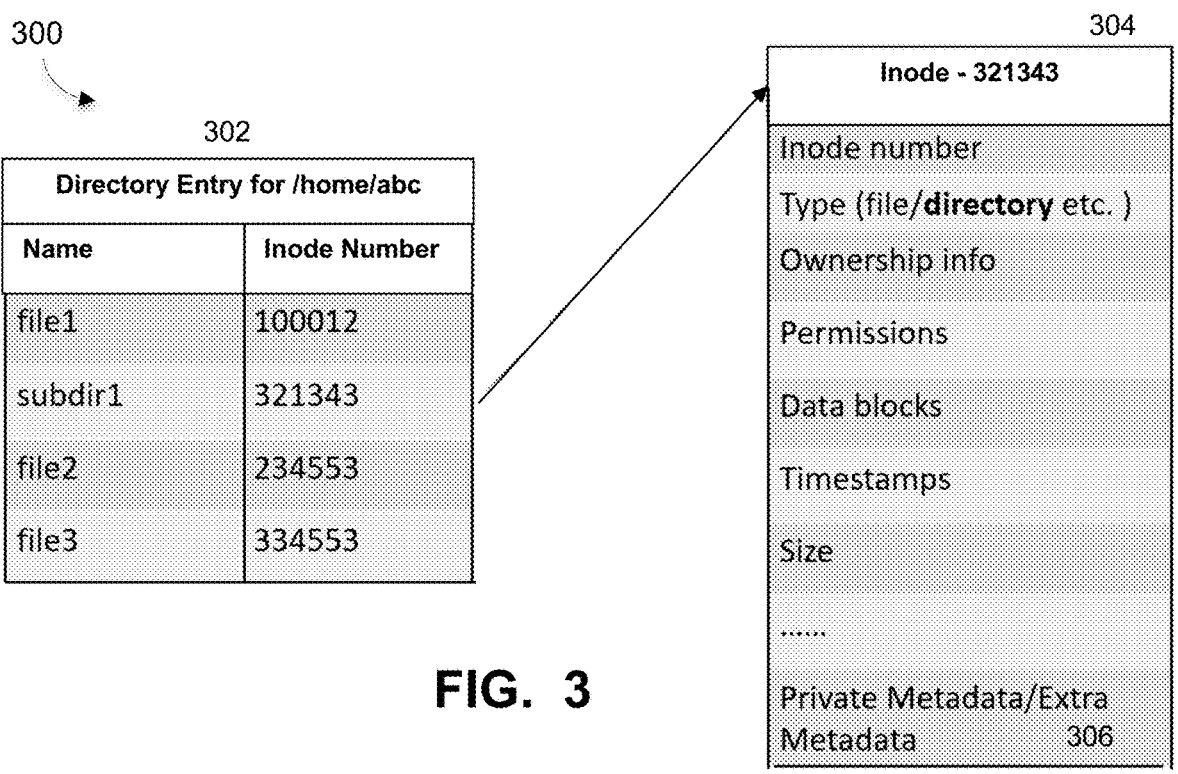
FIG. 3 illustrates an example of directory entries and inodes for a filesystem, under some embodiments.

FIG. 3 illustrates an example of directory entries and inodes for a filesystem, under some embodiments. Diagram 300 shows a directory entry table 302 for an example directory '/home/abc.' This directory contains several example data elements such as files (file1, file2, file3), and subdirectories (subdir1). The subdirectory has inode number 321343 and a corresponding table 304 for this inode contains the various metadata, such as the number, type, ownership, permissions, data blocks, timestamps, size, and so on, as shown.

The inode directory entry 304 also has a private or extra metadata region 306, which is used by process 121 to store certain RL attribute metadata elements.

The primary RL attribute used by process 121 is the retention duration, which can be expressed as "default-retention-duration" defining the lock period during which the file will be auto-locked. For example, if the "default-retention-duration" is one week, the file would be locked for one week from the time of creation.

Another attribute, which may be optional, is the cooling period ("COP"), which is the period of time after which the file will become automatically locked if no modifications happen during that period. A COP of '0' or no COP means that a file is auto-locked immediately upon being created. For example, if the COP is 2 hours, then the file would become locked for the specified default-retention duration only after 2 hours of the last modification if no further modifications happen within that period of time.

The backup server may choose to store other RL attributes as well, as per its need and requirements.

In an embodiment, these RL attributes are stored in the private metadata area 306 of the directory entry structures (dirent/dentry) or the directory inode in the filesystem namespace, as provided by the system. The directory inode metadata is always persisted to disk, so the RL attributes would likewise be persisted automatically. Depending on system configuration, appropriate "Set" and "Get" methods would aid in reading and writing these attributes as needed.

Different methods may be used to set the default-retention-duration and cooling period attributes in the private metadata area. For example, setting of the retention attributes for the directory entry can be done by a simple operation like: "Setattr of last-accessed-time" and the value being a future date in epoch seconds. On the presence of future dates, these operations can be intercepted by the method and dealt with appropriately to set the values in the directory's dirent instead of doing regular setattr( ) operations.

In another example, a feature "extended attributes" can be set on the directory in order to set the default-retention-duration and cooling period attributes.

In yet another example, the backup server might provide APIs to directly go into the filesystem interface and set the values on the given directory's dirent.

Appropriate ways to set the retention attributes may be implemented depending on the configuration and requirements of the backup system and software.

In an embodiment, when a file gets locked, a special flag is set in the file's private metadata to indicate whether its manually locked ("Manually Locked") or auto-locked ("ARL File"). FIG. 4 illustrates labelling a file with a flag indicating its lock state, under some embodiments. As shown in diagram 400 of FIG. 4, each file 422 has a single flag (or label) 424 that indicates whether or not the file is an ARL file or not. If it is an ARL file, the flag contains an appropriate text or alphanumeric string such as "ARL_File" in a demarcated area of the file. No label or an appropriate null label (e.g., "No_ARL_File") would indicate that the file is not an ARL file.

In present systems, the RL attributes are copied from the Mtree's RL configuration and stored in the file's private metadata itself. This creates the limitation described above in which selective ARL locking of individual data elements is not easily possible. Embodiments overcome this limitation by allowing users to configure ARL or No-ARL policies at the directory level itself. The "default retention duration" and COP values are stored in the directory inode's private metadata. Only the COP value is copied to the file's private metadata area, and the default-retention-duration is always referenced directly from the directory's private metadata whenever needed.

For the embodiment of FIG. 4, a parent directory 430 can be configured for ARL and the attributes DRD and COP will be stored in the directory's private metadata 432 itself. When a new file is created under the parent directory 430, only the COP value 426 will be copied to the file's private metadata 428. The DRD value will not be copied to the file's metadata and will always be referenced directly from the parent directory's metadata 432. Such files are marked as "ARL_File" via the flag value 424 and stored in the file's metadata 428 itself. If the parent directory 430 is not configured for ARL, then the new files created under it will not be marked as "ARL_File". The attributes 432 may generally be encapsulated as text string or similar data element.

In an embodiment, certain lock state determination logic is used to determine the lock state of an ARL file, that is, a file created under ARL enabled Mtrees. FIG. 5 is a table 500 that illustrates certain lock state determination logic rules, under some embodiments. As shown in table 500, a file is not locked by ARL if it is not marked as "ARL_File." In this case, the flag 424 is empty or null, and there are no restrictions on modifying (editing, deleting, renaming, moving, etc.) the file by a user or application.

A file is under ARL lock and within the COP period if the current-time is within the last-modified-time of the file plus the COP. In this case, modifying of the file will be allowed the same as if it were not locked.

A file is ARL locked if the current-time is after (greater than) the last-modified-time of the file plus the COP. In this case, any attempted modification (writes, deletes, renames etc.) will be blocked.

An ARL file lock has expired if the current-time is after the file-creation-time plus the default-retention-duration. In this case, only deletes and renames of the file allowed. No editing or modification of such a file is allowed.

The lock state determination logic of FIG. 5 applies to ARL locked files only. Such files are marked as "manually locked," and the above lock state determination logic is not applicable. Furthermore, for manually locked files, the expiry date and cooling period are stored in the file metadata itself.

In an embodiment, methods allow users to configure No-ARL policy for directories by marking directories to exclude them from the ARL application so as to provide selective locking of the namespace, but in an exclusionary manner.

Exclusionary ARL Control at Top-Level Directories

It should be noted that for purposes of description, the terms 'namespace' and 'Mtree' are generally used interchangeably, and in the context of a DDFS system. As mentioned above, an namespace is an Mtree, which itself is a managed tree comprising a directory of files. The DDFS system exposes a namespace as Mtrees. FIG. 6 illustrates an example directory structure comprising namespaces in a DDFS system, under some embodiments. As shown in FIG. 6, directory structure 600 for DDFS system 602 comprises a number (N) of namespaces denoted namespace #1 to namespace #N. Each namespace comprises a respective Mtree denoted Mtree_1 to Mtree_N and each namespace/Mtree has a corresponding retention mode 604 set for that namespace. Although FIG. 6 is illustrated for a DDFS system, embodiments are not so limited. Other operating systems may use different tree names for their namespaces, but can all generally represented in the tree structure of FIG. 6.

In an embodiment, retention lock settings can be set on the filesystem at the top-level of the directory hierarchy so that auto-lock enforcement will be applicable only to non-excluded files at that directory level. This embodiment implements an exclusionary ARL locking process 123, as shown in FIG. 1.

Figure 7A:
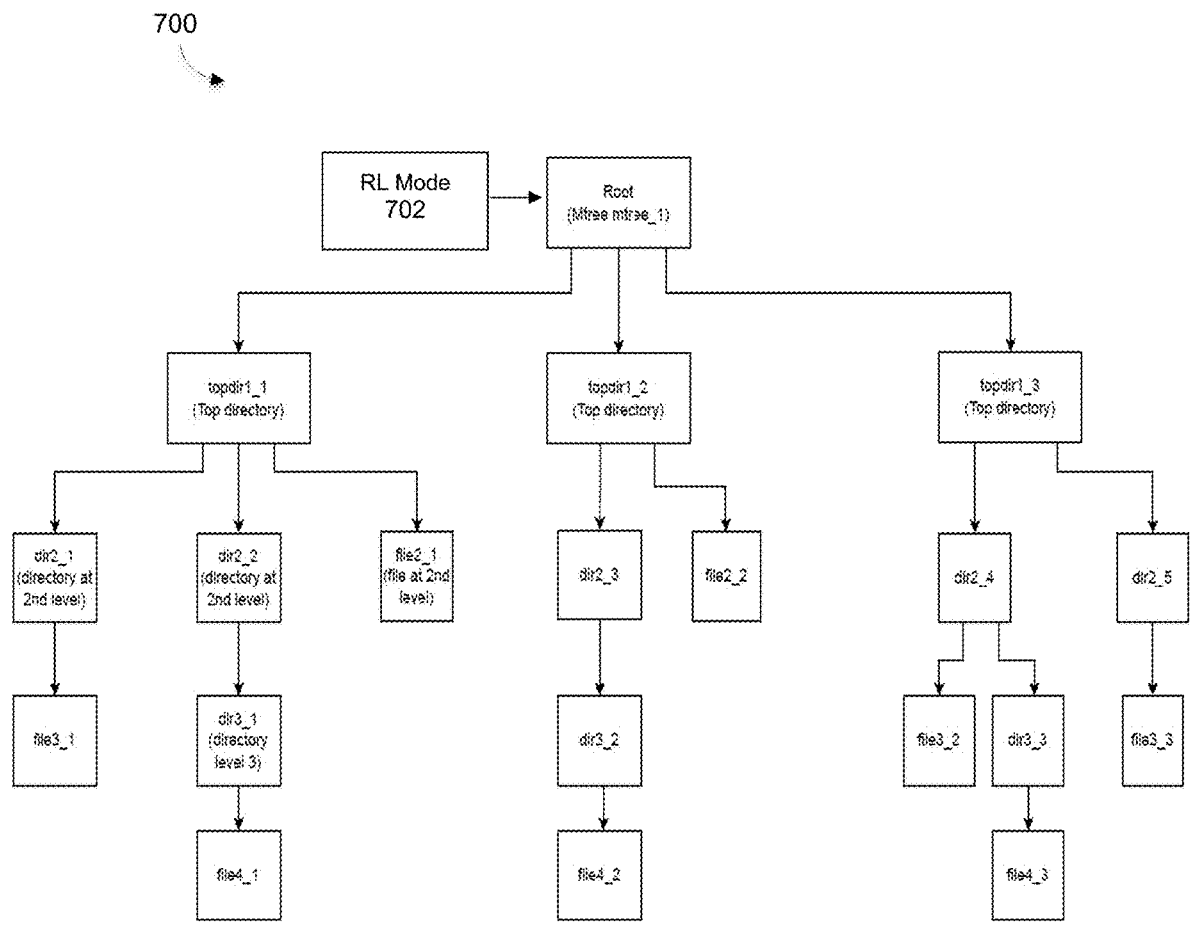
FIG. 7A illustrates an example base tree with files and directories within an Mtree that can implement exclusionary ARL locking, under an example embodiment.

FIG. 7A illustrates an example base tree with files and directories within an Mtree that can implement exclusionary ARL locking, under an example embodiment. The namespace 700 of FIG. 7A contains a Mtree directory structure starting from a root node (root of the filesystem) down to individual files through various directory and sub-directory levels. The root is the beginning of the filesystem or Mtree, and in Linux is represented as '/', while in Windows OS, it would be represented by the mounted drive letter e.g., 'C: \' or 'D: \', etc. All directories and files are under this root only. Topmost or top-level directories are directories created directly under the root of the filesystem, and are thus in the level1 themselves.

For the example of FIG. 7A, the Root has three top level directories ("topdir") denoted topdir1_1, topdir1_2, and topdir1_3. Each of these topdir directories have respective lower level or sub-directories, such as dir2_3 under topdir1_2, and this directory ultimately holds file 4_2 within the dir3_2 sub-directory. Other directory structures within namespace 700 can also be seen. The directories and file can be referenced organizationally according to any appropriate naming convention, "1_y" to refer to a top level of the tree, "2_y" to refer to a next lower level, "3_y" to refer to the next lower level of the tree, and so on, where 'y' references the vertical branches of the tree, as shown in FIG. 7A.

Under ARL locking, once the cool off period is past, the files in the namespace are auto-locked. When the Mtree is ARL enabled, after the cool off period, every file ingested in the Mtree is locked using the Mtree level ARL policy. In this case, all of the file and directories are locked in accordance with the ARL and COP settings of the Root directory. If the Mtree is not ARL enabled, but only manual RL (MRL) enabled, then individual directories/files can be locked and unlocked manually, and there is no cool off period, the lock is immediately applied. In this case, individual files, such as file4_2 or file 3_3, for example, can be locked separately from all other elements in the Mtree.

Figure 7B:
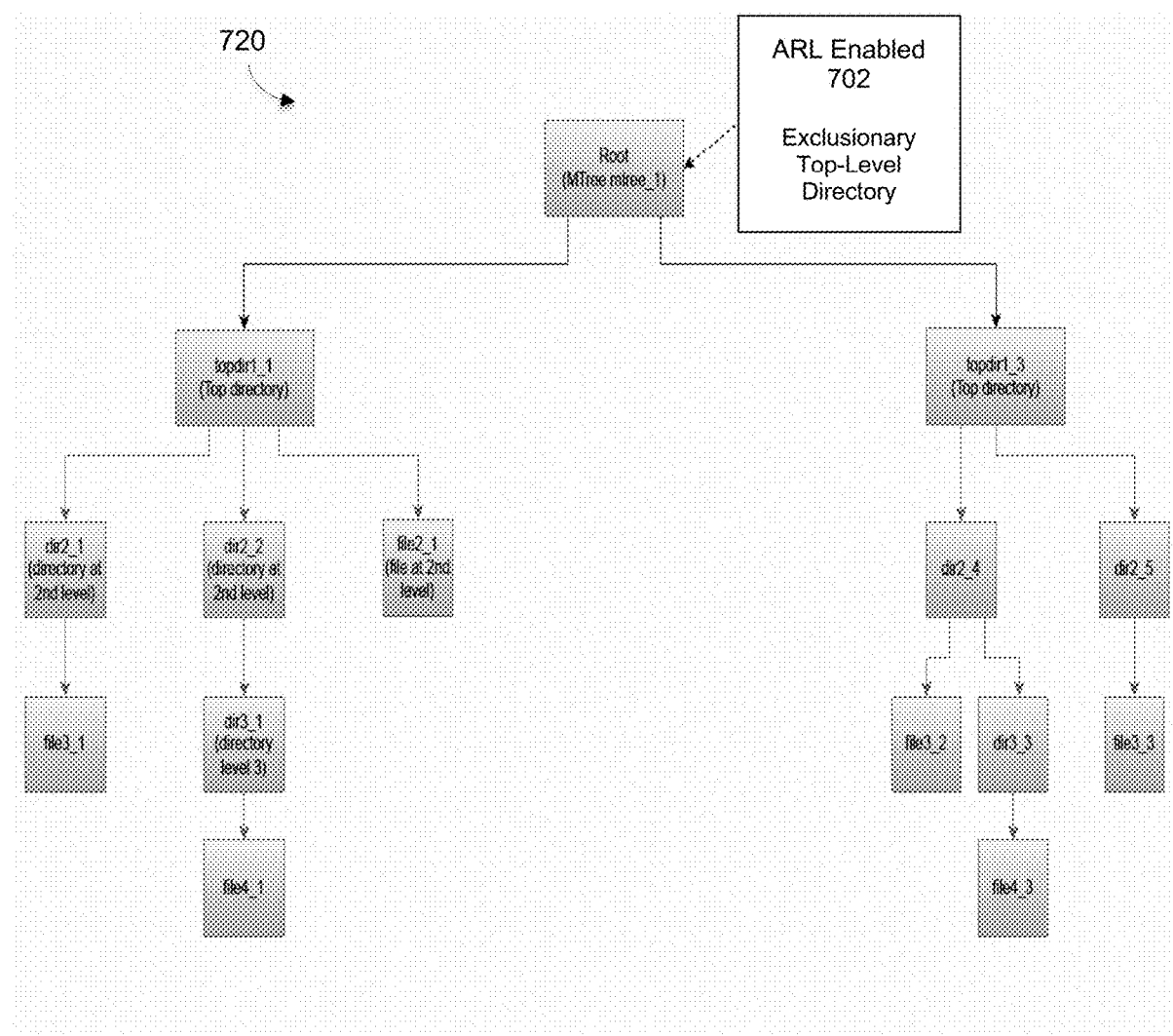
FIG. 7B illustrates the example namespace of FIG. 7A implementing exclusionary ARL control at a top directory level, under some embodiments.

In an embodiment, Mtree 700 can be configured to implement exclusionary ARL control at a directory level, under some embodiments. FIG. 7B illustrates the example namespace of FIG. 7A implementing exclusionary ARL control at a top directory level, under some embodiments.

When a root directory for an Mtree (e.g., Mtree_1) is created with ARL enabled 702, the existing top level directories and their constituent directories/files are all automatically locked after the specified COP. For the example of FIG. 7B, it is assumed that topdir1_1 and topdir1_3 existed at the time that the ARL enabled configuration 702 was set for Mtree_1, and thus all of the tree elements are auto-locked, as shown as displayed in gray-scale.

The ARL configuration 702, as marked 'exclusionary top-level directory', sets the ARL mode for tree structure 720 as exclusionary and set at the directory level. For this embodiment, any later added directory will not be auto-locked under the ARL configuration 702. That is, any later added directory will be excluded from auto retention locking (No-ARL). After applying the ARL setting 702, only top level directories can be added with ARL exclusion.

Figure 8:
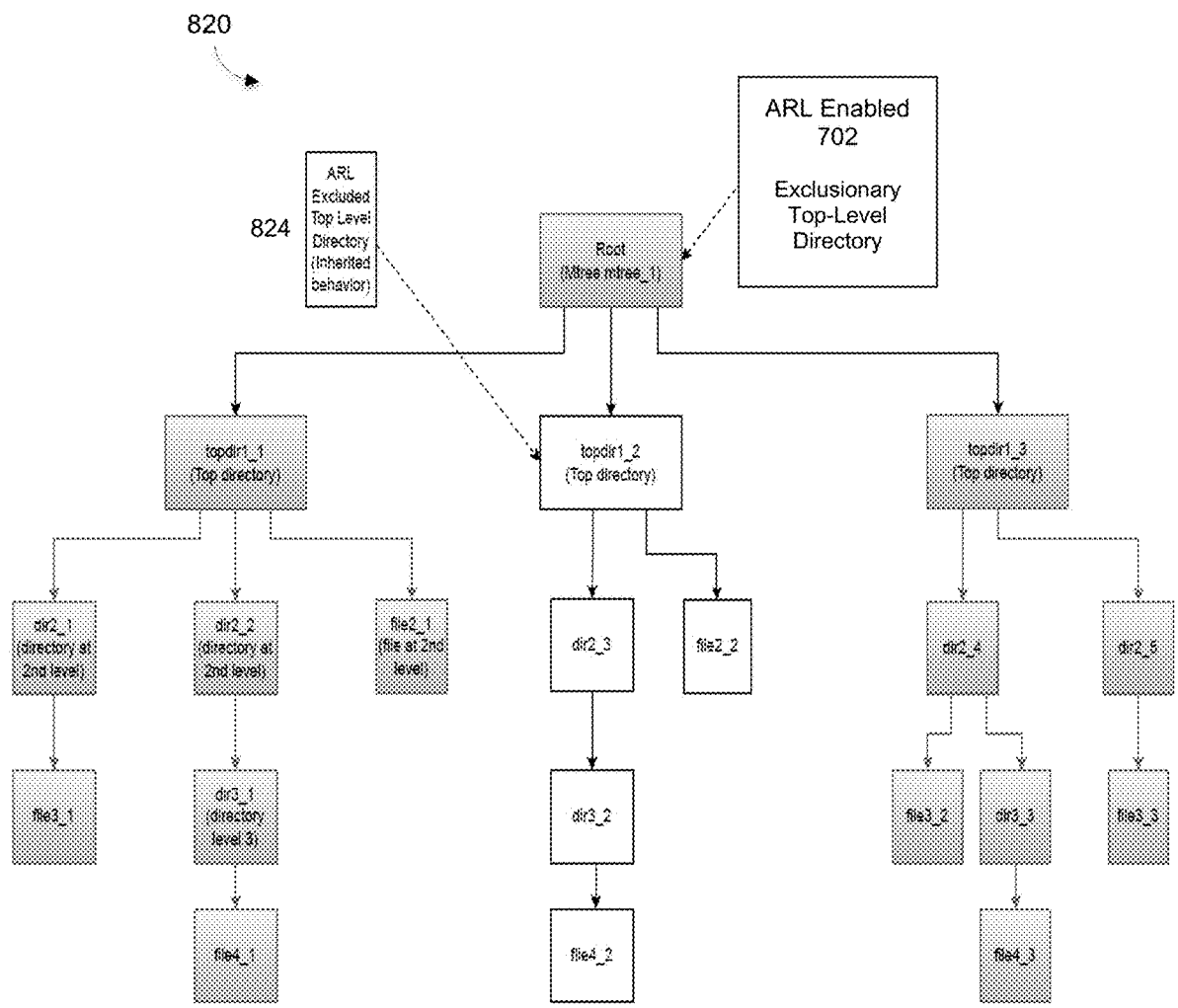
FIG. 8 illustrates the Mtree of FIG. 7B with an ARL excluded top level directory, under an example embodiment.

In an embodiment, files can be excluded at a top-level directory. FIG. 8 illustrates the MTree of FIG. 7B with an ARL excluded top level directory, under an example embodiment. As shown in FIG. 8, Mtree 820 is an ARL enabled Mtree with ARL and COP configurations specified in the Root directory. This setting applies to all elements of the Mtree when the ARL configuration 702 is applied. If a directory is added later, it is possible to exclude that directory from the ARL configuration if desired.

For the example of FIG. 8, one of the top directories (topdir1_2) is an ARL excluded top level directory, 824. It is assumed that this directory is added after the ARL configuration 702 is set. Directory topdir1_2 is explicitly configured with a "NO-ARL" or similar setting label. With this setting, all subdirectories and files under this top-level directory are not automatically retention locked using the Mtree level ARL policy 702. These sub-elements inherit the setting of the top level directory, and are either not auto-lockable (No-ARL) or are eligible for locking through individual manual (MRL) retention locks.

For the example of FIG. 8, the tree elements shown in gray-scale (corresponding to FIG. 7B), such as topdir1_1 are retention locked under the Mtree level ARL policy 702, and the tree elements shown as white boxes, such as topdir1_2 are non-ARL locked files, or 'ARL excluded' elements.

The ARL exclusion process can also be applied to sub-directories or files under the top level directory as long as they were added after the ARL configuration of their top or parent directory.

In an embodiment, the ARL policy may be set at the Mtree level to lock out all top level directories and constituents existing at the time of the ARL setting, and an ARL exclusion at the top directory level may be set for directories added later to allow elements in these directories to be excluded from ARL. For this embodiment, a user will configure ARL on Mtrees or filesystem levels to control whether or not all files under the Mtree are auto-locked. The user must also enable ARL at the Mtree or file system level first.

With process 123, the user can mark a top level directory (e.g., topdir1_2) as "No-ARL" or similar label. In an embodiment, this No-ARL flag can only be set for the top-most directories in the namespace, that is, the directories directly below or under the Root directory. This setting will fail the operation if an attempt is made to mark No-ARL on any non-topmost level directory. For the example of FIG. 7, No-ARL cannot be marked for any of dir2_3, dir3_2, file4-2, or file2_2.

Any file created in a directory below a top directory marked No-ARL will be exempted from ARL and remain non-locked. Such files can be manually locked if desired, but the files will not be auto-locked. Any file created outside of the No-ARL directory will be covered by the Mtree level ARL policy and will get auto-locked after the specified cooling period, and reference the retention lock attributes configured in the Mtree.

Marking a top-most directory as No-ARL will set a special flag in the directory's "dentry" or directory entry metadata or inode metadata to indicate that the respective directory is a "No-ARL" directory. This flag is referred to as "NO_ARL_DIRECTORY."

All sub-directories created under this directory will inherit this flag upon their creation, and will be stored in their respective dentry metadata or inode metadata (i.e., the same place as their parent directory).

When a file create operation is triggered, it will first check if the parent directory has the NO_ARL_LOCK_DIRECTORY flag set or not. If the flag is set, it will then skip the ARL set on the file completely. The file will not be marked as an "ARL_File" and will never get auto-locked, and will continue to remain unlocked, unless manually locked later.

If the flag is not found, then method will continue with the ARL setting process, and the file will be marked as "ARL File." For auto locked files, the process will fetch the default-retention-duration (DRD) and cooling period value (COP) from the Mtree's ARL configuration and copy it to the file's private metadata.

A file under any of the No-ARL directories can be found to be in a locked state only if it was manually locked in the past and never through auto-locking. The locks for such manually locked files can be manually extended as and when needed. Such files are never affected by any change in Mtree level ARL attributes.

The topmost directory where No-ARL is set, can be deleted as and when needed, since the directory is not controlled by the Mtree ARL configuration, and does not contain any locked files. If, however, one or more files under such a No-ARL directory are manually locked, then the directory deletion will fail while trying to remove the locked files, which is standard procedure for retention locked files under manual locking.

Sub-Directory Level Exclusionary ARL

FIG. 8 illustrates an embodiment in which exclusionary ARL is imposed at the top level directory, using the ARL enabled process 702 of FIG. 7A. In another embodiment, exclusionary ARL can be defined at directory levels lower than the top-most directory, namely at the sub-directory level.

Figure 9A:
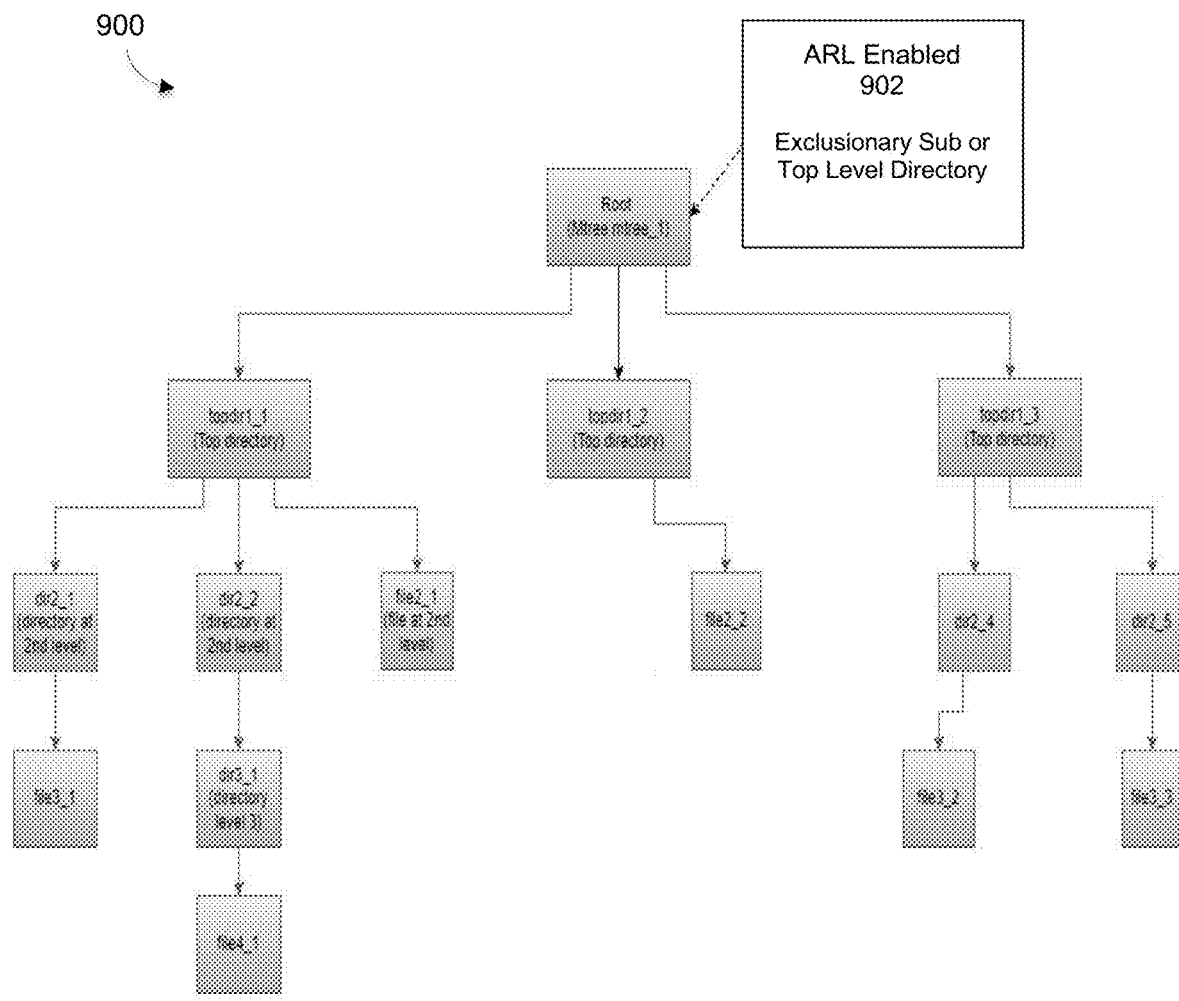
FIG. 9A illustrates an example Mtree to have ARL exclusions enabled at the top level or sub-directory level, under an example embodiment.
Figure 9B:
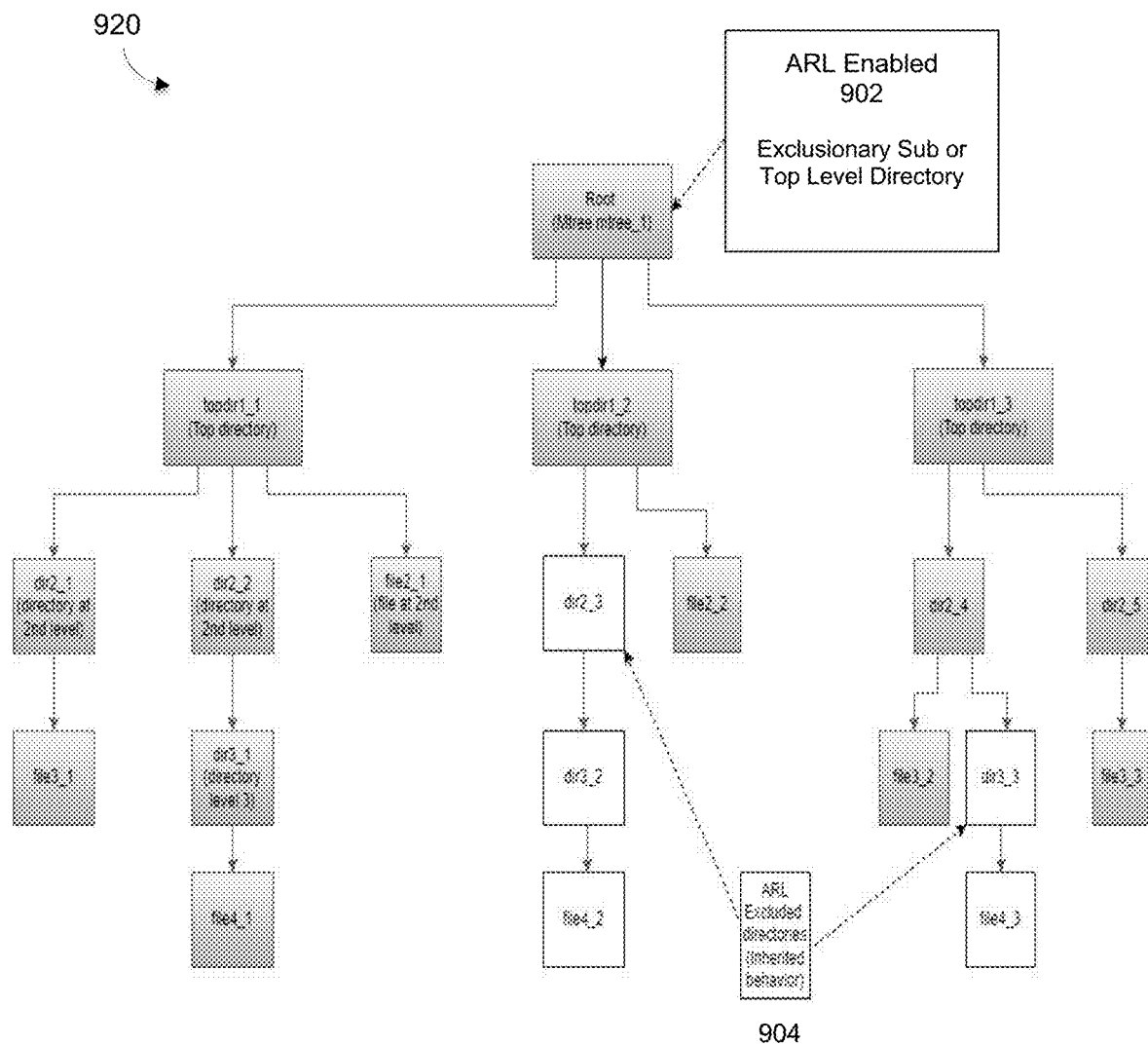
FIG. 9B illustrates the Mtree of FIG. 9A showing sub-directories that ARL excluded, under an example embodiment.

FIG. 9A illustrates an example Mtree to have ARL exclusions enabled at the top level or sub-directory level, under an example embodiment. For this embodiment, existing Mtree 900 is to have an ARL enabled configuration 902 applied. This is applied at the top level (e.g., Root) of the Mtree, which opens up Mtree 900 to allow creation of new starting point folders that begin with no ARL. FIG. 9B illustrates the Mtree of FIG. 9A showing certain sub-directories that ARL excluded. As shown in Mtree 920, the Mtree of FIG. 9A has added excluded sub-directories dir2_3 and dir3_3 as well as all of the respective sub-directories under them, after operation of step 904. This process allows a user to create and exclude a sub-directory with ARL excluded so that none of the files under that directory are locked using Mtree level ARL policies. The Mtree 920 can revert to the state of 900 since the added sub-directories were added with exclusion so that these can be deleted.

As shown in FIG. 9B, Mtree 920 is an ARL enabled Mtree with ARL and COP configurations specified in the Root directory. This setting applies to all elements of the Mtree when the ARL configuration 902 is applied. If a directory is added later, it is possible to exclude that directory from the ARL configuration if desired.

After applying ARL configuration 902, ARL exclusion can thus be done for any new directory at any level, i.e., a top or any sub-level directory. This is in contrast to the ARL configuration 702 of FIG. 7 in which only the top level directories can be added with ARL exclusion. It should be noted that only one type of configuration 702 or 902 can be enabled for the Mtree, and is not modifiable once applied. Thus, a top-level only configuration (702) is fixed and cannot be applied to sub-directories.

For the example of FIG. 9B, one or more of the sub-directories, dir2_3 under topdir1_2, and dir3_3 under dir2_4, are ARL excluded sub-directories, 904. It is assumed that these directories were added after the ARL configuration 902 is set, as they must not have existed when the ARL setting 902 was applied to the Mtree 900.

These two sub-directories are explicitly configured with a "NO-ARL" or similar setting label. With this setting, all subdirectories and files under the respective directories are not automatically retention locked using the Mtree level ARL policy 902. They inherit the settings of the respective parent sub-directories, and are either not auto-lockable (No-ARL) or are eligible for locking through individual manual (MRL) retention locks.

For the example of FIG. 9B, the tree elements shown in gray-scale (corresponding to FIG. 7B), such as topdir1_1 are retention locked under the Mtree level ARL policy 902, and the tree elements shown as white boxes, such as dir2_3, dir3_2, and so on, are non-ARL locked files, or 'ARL excluded' elements. None of these files, are therefore locked using the original Mtree level ARL policy, 902, but are instead excluded from ARL per policy 904. The policy 904 at the sub-directory level is inheritable in that all further sub-directories created under an ARL excluded sub-directory will also be excluded. In an embodiment, an ARL exclusion flag or other indicator is used to indicate that a sub-directory is ARL excluded by the policy 904.

Figure 10:
FIG. 10 is a flowchart that illustrates configuring a namespace for ARL exclusion at a sub-directory level, under some embodiments.

FIG. 10 is a flowchart that illustrates configuring a namespace for ARL exclusion at a directory level, under some embodiments. As shown in FIG. 10, process 950 begins with defining an ARL period and COP attributes for the Mtree or Root directory of a namespace, 952. This dictates the ARL configuration for all directories/sub-directories/files existing in the namespace at the time the ARL configuration is set. Later added sub-directories may be configured to be outside of the Mtree ARL configuration. For these sub-directories, such as shown in the example of FIG. 9B, a flag may be set indicating that the directory is a "NO_ARL_SUBDIRECTORY," 954. Such a flag can be set on any desired sub-directory. This setting is inherited by all further sub-directories of a flagged sub-directory 956. Accordingly, files under any of these sub-directories are not auto-locked by the Mtree ARL policies.

In step 958, upon creation of a file or directory within a flagged sub-directory, the file system checks the parent directory for the NO_ARL_SUBDIRECTORY flag. This may be an inherited flag (from its parent or above levels) or a directly entered flag (starting from that sub-directory itself).

If the flag is not set, the file is not ARL excluded, and it will be marked as an ARL_File and can then be auto-locked after the specified COP, 964. If, however, the flag is set, the file is not marked as an ARL_File, and will never be auto-locked under the Mtree ARL policy, 962. Such a file may be manually locked, however, if desired.

A file under any of the ARL excluded directories can be in a locked state only if it was manually locked previously, and never through auto-locking. The locks for such manually locked files can be extended as and when needed, and only again manually. Such files are never affected by any change in Mtree or sub-directory level ARL policies. The topmost directory where No-ARL is set, can be deleted as and when needed, as it does not fall under the purview of ARL and does not contain any locked files. If, however, one or more files under such ARL excluded directories are manually locked, then the directory deletion will fail while trying to remove the locked files, per normal retention lock behavior.

Embodiments are directed to enabling ARL mode for either a top-level directory (process 702) or sub-level directory (process 902). In general, a user can apply either the 702 or 902 mode of ARL enablement.

With respect to process 702, once it is applied, the user can create an exclusion only at the top level. The process may be more efficient for deployment, as the system needs to handle only the top level. Once process 702 is applied, an exclusion cannot be created for any sub-directory.

With respect to process 902, once it is applied, the user can create an exclusion at the top level or at any sub-directory level. This process is thus more flexible, but is not as efficient as process 702 as the system must handle exclusions at any level. Once process 902 is applied, an exclusion can be created for any sub-directory, and once it is applied, it cannot be converted to a top-level process (702) as there may be exclusions at sub-directory levels.

A user may choose to apply one or the other process based on control versus flexibility considerations. For example, process 702 provides relatively tight control over ARL exclusions. With this process, a top level walk immediately informs the non-ARL paths. Process 902 provides flexibility over individual sub-directories but the non-ARL paths are not easily seen without walking the entire namespace. With process 902, a user must walk the entire namespace each time to determine the current non-ARL paths. Basically, process 702 is used if an exclusion is needed only at the top level, such as in a case where files can change and are concentrated in one branch or only a few branches starting at the top directory.

Embodiments of the sub-directory level ARL exclusion policy are also applicable to use by backup applications that utilize multiple Mtrees, such as for metadata versus data, where the metadata Mtree may be configured without ARL, while the backup data Mtree may be configured with ARL enabled. Allowing granular selection of ARL inclusion or exclusion at the sub-directory level allows the system to overcome the present issues associated with utilizing multiple Mtrees for the same policy, such as complexity and cost, as mentioned previously. Such present systems can store non-locked metadata files along with locked backup data in the same ARL enabled Mtree/storage unit.

Embodiments described herein provide a method that provides much more control in defining a selective auto-locking policy for a set or group of files in the namespace, which was not heretofore possible. Backup applications can now have different retention lock configurations under the same filesystem or Mtree. By configuring only specific directories to come under ARL, backup applications can have directories that are "No-ARL," that is, do not come under the control of ARL, which is beneficial for non-integrated backup applications that store re-writeable files.

The method provides the flexibility to have different classes of lock duration, which are inherited by nature. No change is required in the backup applications write logic and no layout restructuring is needed. For example, directories where the application will write backup data can be configured for ARL and others will remain outside of the ARL scheme.

Backup systems, such as system 100, typically create and assemble the backup files in a staging area. For example, a PPDM system may define a special directory called "staging." Once the backups are complete, the assembled backup files are moved to the final directory. For PPDM, this directory is called "current."

Certain client-side (DDBoost) integrated applications, like PPDM, can lock files independently through manual locking method, and they may use defined DDBoost APIs to achieve this. However, it is generally harder for the non-integrated applications (ones that use public protocols like NFS) to lock files in this manner, so ARL was developed for such applications. ARL was to generally developed to avoid changes within the backup application's workflow. Once the files land (and after the COP), the application would not need to do any manual locking. There would be no change in backup application business logic, and yet the retention locking would be achieved.

Such applications, however, must finish the assembly of the backups in the staging area within the cooling off period. If they do not do so, the move to the final directory will fail. The definition of the cooling off period is therefore critical to success. It is also hard to handle failure conditions. For example, if there were a network failure, the files in the staging directory would be locked, and could not be removed or modified till the lock expires. The exclusion method described herein provides a benefit.

In an embodiment two top-level directories are defined and denoted "staging" and "current". The staging directory (and all the child files or directories) will be excluded from automatic locking, while the current directory has no such exclusions. The application assembles the backup in the staging area. Once complete, the application moves the backup files (and directories) to the "current" directory.

Upon the move operation and after the cooling off period, the backup files are locked automatically.

While in the staging area, there is no locking, thus allowing the backup application to manage the backup and any failure conditions, thus making the retention locking transparent to the backup application.

Although embodiments are illustrated and described with respect to a Power Protect Data Domain system, which is a purpose-built backup appliance providing streaming deduplication, it should be noted that embodiments are not so limited and any other deduplication backup system may be used. Similarly, network 110 if cloud-based may integrate with an Dell ECS (or similar) system embodied as a public cloud or hosted private cloud to provide a scalable storage architecture. The system 100 may thus be implemented as an ECS-based object storage platform designed around use cases of an ever expanding cloud enabled data center. Object containers that can be created as an endless pool and scaled out across an expandable pool of storage nodes, and data may be stored as objects and accessed through API calls across multiple protocols including S3, Swift, and NFS among others. Embodiments are not so limited however, and other similar cloud-based storage systems may be used.

Embodiments of the processes and techniques described above can be implemented on any appropriate backup system operating environment or file system, or network server system. Such embodiments may include other or alternative data structures or definitions as needed or appropriate.

Figure 11:
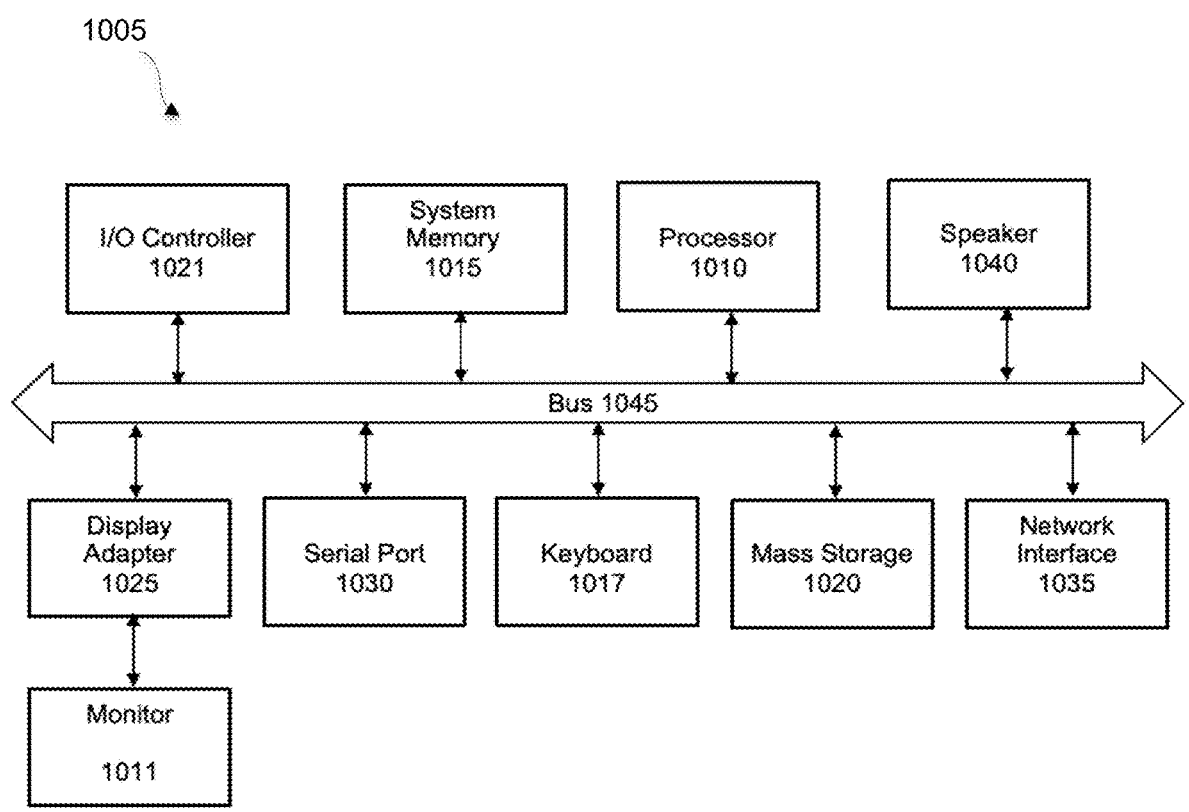
FIG. 11 is a system block diagram of a computer system used to execute one or more software components of system implementing one or more processes described herein, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 11 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.x), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method to apply selective exclusion of auto retention locking configurations to files in a directory-based namespace in a filesystem, comprising:

defining attributes comprising an automatic retention lock (ARL) period specifying an amount of time to lock the file, and a cooling period (COP) specifying an amount of time within the ARL period after which the file will be locked if no modifications are made to the file during the COP;

storing the ARL period and COP period as the attributes in a directory level data element of the namespace;

enabling ARL on the namespace to automatically lock all elements in the namespace for the ARL period after the COP;

allowing exclusion by a configuration of the ARL for a later added sub-directory to the namespace as an excluded directory by labeling the excluded directory as a No-ARL Directory, wherein the sub-directory comprises a directory below the top level or root directory in a tree hierarchy defined in the namespace; and propagating the exclusion of the ARL to all files and further sub-directories under the excluded sub-directory, wherein sub-directories within the namespace not labeled as a No-ARL Directory will be included in the ARL policy enabled on the root directory, and wherein files within a No-ARL Directory and associated lower level sub-directories are each marked as No-ARL file;

referencing the ARL period from a parent directory; and copying the COP from the parent directory to metadata of the file, wherein the ARL conforms to lock state determination rules comprising:

imposing no restrictions on modifying, editing, deleting, renaming, or moving the file if the file is not marked as ARL file;

imposing no restrictions on modifying, editing, deleting, renaming, or moving the file if the file is marked as an ARL file and a current time is within a last modified time of the file plus the COP period;

blocking any attempted modifying, editing, deleting, renaming, or moving the file if the current time after the last modified time of the file plus the COP period and if the file is marked as an ARL file; and allowing only deletes or renames of the file if the current time is after a creation time of the plus the ARL period.

2. The method of claim 1 wherein the ARL lock period locks the files from modification, revision, deletion, or renaming.

3. The method of claim 1 further comprising allowing files within the excluded directory and its sub-directory hierarchy to be manually retention locked.

4. The method of claim 1 wherein the each file is identified by a filename and directory name that and mapped to a respective inode data structure in the filesystem, wherein an inode stores metadata of a corresponding file including permissions, ownership, flags, types, and data block identifiers.

5. The method of claim 4 wherein the directory entry maps a filename to a respective inode number, and each file and directory are backed up by a respective inode by the backup server, and further wherein each inode further comprises a private metadata area for storage of one or more of the ARL period or COP period as ARL attributes of a corresponding file.

6. The method of claim 5, wherein the backup server comprises a Power Protect Data Domain File System deduplication backup system, and wherein the file is saved in the directory-based namespace comprising an Mtree.

7. The method of claim 6 further comprising using the file lock state to appropriately lock the file during a backup or restore operation initiated by a backup server hosting the filesystem.

8. A system for selectively excluding automatic retention locking (ARL) of a file stored in a directory-based namespace in a filesystem of a backup server executing a backup application, comprising:

a hardware-based retention lock component defining attributes comprising an automatic retention lock (ARL) period specifying an amount of time to lock the file, and a cooling period (COP) specifying an amount of time within the ARL period after which the file will be locked if no modifications are made to the file during the COP;

a directory level data element of the namespace storing the ARL period and COP period as the attributes in a sub-directory level data element of the namespace; and a hardware component enabling ARL of the namespace to automatically lock all elements in the namespace for the ARL period after the COP, allowing exclusion of the ARL for a later added sub-directory to the namespace as an excluded directory by labeling the excluded directory as a No-ARL directory, and propagating the exclusion of the ARL to all files and further sub-directories under the excluded sub-directory, wherein the sub-directory comprises a directory below the top level or root directory in a tree hierarchy defined in the namespace and sub-directories within the namespace not labeled as a No-ARL Directory will be included in the ARL policy enabled on the root directory, and wherein files within a No-ARL Directory and associated lower level sub-directories are each marked as No-ARL file, the hardware component configured to:

reference the ARL period from a parent directory; and copy the COP from the parent directory to metadata of the file, wherein the ARL conforms to lock state determination rules comprising:

impose no restrictions on modifying, editing, deleting, renaming, or moving the file if the file is not marked as ARL file;

impose no restrictions on modifying, editing, deleting, renaming, or moving the file if the file is marked as an ARL file and a current time is within a last modified time of the file plus the COP period;

block any attempted modifying, editing, deleting, renaming, or moving the file if the current time after the last modified time of the file plus the COP period and if the file is marked as an ARL file; and allow only deletes or renames of the file if the current time is after a creation time of the plus the ARL period.

9. The system of claim 8 wherein the backup system comprises a Power Protect Data Domain File System backup system, and wherein the directory-based namespace comprises an Mtree.

10. The system of claim 9 wherein the namespace comprises at least one of a filesystem, a hierarchical directory, a managed Tree-based directory, a data share, a container, a data bucket, or one or more files, and wherein the directory level data element comprises a directory entry in each file of the filesystem.

11. The system of claim 10 wherein the each file is identified by a filename and directory name that and mapped to a respective inode data structure in the filesystem, wherein an inode stores metadata of a corresponding file including permissions, ownership, flags, types, and data block identifiers.

12. The system of claim 11 wherein the directory entry maps a filename to a respective inode number, and each file and directory are backed up by a respective inode by the backup server, and further wherein each inode further comprises a private metadata area for storage of one or more of the ARL period or COP period as ARL attributes of a corresponding file.

13. A computer-implemented method to apply selective exclusion of auto retention locking configurations to files in a directory-based namespace in a filesystem to allow storage of non-locked metadata files with locked backup data in a same Automatic Retention Lock (ARL) enabled directory storage unit, comprising:
  storing metadata for backup data in a first sub-tree of a directory tree having ARL not enabled;
  storing content data for the backup data in a second sub-tree of the directory tree having ARL enabled;
  defining ARL policies at a root directory of the directory tree to automatically lock all elements in the namespace for a defined ARL period after a defined cooling off period;
  excluding the ARL policies at a sub-directory flagged as ARL_excluded, for any selected sub-directory added after the defining step, wherein the sub-directory comprises a directory below the top level or root directory in a tree hierarchy defined in the namespace; and
  propagating exclusion of the ARL to all files and further sub-directories under the flagged sub-directory, wherein sub-directories within the namespace not labeled as a No-ARL Directory will be included in the ARL policy enabled on the root directory, and wherein files within a No-ARL Directory and associated lower level sub-directories are each marked as No-ARL file;
  referencing the ARL period from a parent directory; and
  copying the COP from the parent directory to metadata of the file, wherein the ARL conforms to lock state determination rules comprising:
  imposing no restrictions on modifying, editing, deleting, renaming, or moving the file if the file is not marked as ARL file;
  imposing no restrictions on modifying, editing, deleting, renaming, or moving the file if the file is marked as an ARL file and a current time is within a last modified time of the file plus the COP period;
  blocking any attempted modifying, editing, deleting, renaming, or moving the file if the current time after the last modified time of the file plus the COP period and if the file is marked as an ARL file; and
  allowing only deletes or renames of the file if the current time is after a creation time of the plus the ARL period.

14. The method of claim 13 wherein the ARL lock period locks the file from modification, revision, deletion, or renaming, and yet further wherein files within the flagged sub-directory and its sub-directory hierarchy are allowed to be to be manually retention locked.

* * * * *